(12) United States Patent
Ayhan

(10) Patent No.: US 12,546,262 B2
(45) Date of Patent: Feb. 10, 2026

(54) PREDICTING FUEL BURN AND EMISSIONS FOR AIRCRAFT

(71) Applicant: The Boeing Company, Arlington, VA (US)

(72) Inventor: Samet Ayhan, Fairfax, VA (US)

(73) Assignee: The Boeing Company, Arlington, VA (US)

( * ) Notice: Subject to any disclaimer, the term of this patent is extended or adjusted under 35 U.S.C. 154(b) by 65 days.

(21) Appl. No.: 18/628,480

(22) Filed: Apr. 5, 2024

(65) Prior Publication Data

US 2025/0163855 A1    May 22, 2025

Related U.S. Application Data

(60) Provisional application No. 63/600,995, filed on Nov. 20, 2023.

(51) Int. Cl.
*F02C 9/26* (2006.01)
*G06Q 10/04* (2023.01)
(Continued)

(52) U.S. Cl.
CPC ............... *F02C 9/26* (2013.01); *G06Q 10/04* (2013.01); *G06Q 10/0631* (2013.01);
(Continued)

(58) Field of Classification Search
CPC ...... F02C 9/26; G06Q 10/04; G06Q 10/0631; G06Q 50/40; F02D 2200/0625; F05D 2220/323; F05D 2270/31; F05D 2270/709
See application file for complete search history.

(56) References Cited

U.S. PATENT DOCUMENTS 6,134,500 A * 10/2000 Tang ..................... G05D 1/0005
73/178 R
7,966,122 B2 * 6/2011 Flynn ....................... G08G 5/32
701/528
(Continued)

FOREIGN PATENT DOCUMENTS

CN         113962420 A       1/2022

OTHER PUBLICATIONS

S, Baumann. et al., "Modeling of aircraft fuel consumption using machine learning algorithms," CEAS Aeronautical Journal, vol. 11, Sep. 30, 2019, 11 pages.
(Continued)

*Primary Examiner* — Phutthiwat Wongwian
*Assistant Examiner* — Susan E Scharpf
(74) *Attorney, Agent, or Firm* — Alleman Hall LLP

(57) ABSTRACT

A method for fueling an aircraft comprises (a) predicting a sequence of fuel-burn quantities over a planned flight based on at least one sequence of multivariate flight data recorded during a prior flight and on a hidden state of a trained machine. For each of a pre-selected series of prior flights, a corresponding sequence of multivariate flight data recorded during the prior flight is processed in a trainable machine to develop the hidden state, which minimizes an overall residual for replicating the fuel-burn quantities in each corresponding sequence. The method further comprises (b) summing the fuel-burn quantities over the planned flight to obtain a fueling estimate; and (c) fueling the aircraft based in part on the fueling estimate.

20 Claims, 13 Drawing Sheets

(51) Int. Cl.
*G06Q 10/0631* (2023.01)
*G06Q 50/40* (2024.01)

(52) U.S. Cl.
CPC ..... *G06Q 50/40* (2024.01); *F02D 2200/0625* (2013.01); *F05D 2220/323* (2013.01); *F05D 2270/31* (2013.01); *F05D 2270/709* (2013.01)

(56) References Cited

U.S. PATENT DOCUMENTS

| | | | | |
|---|---|---|---|---|
| 9,208,457 | B2* | 12/2015 | Agrawal | G08G 5/32 |
| 12,340,700 | B2* | 6/2025 | Ítalo | G05D 1/646 |
| 2009/0204453 | A1* | 8/2009 | Cooper | G05D 1/0005 |
| | | | | 705/7.36 |
| 2013/0046422 | A1* | 2/2013 | Cabos | G08G 5/32 |
| | | | | 701/120 |
| 2014/0081569 | A1* | 3/2014 | Agrawal | G08G 5/76 |
| | | | | 701/467 |
| 2023/0394977 | A1* | 12/2023 | Ayhan | G08G 5/76 |
| 2023/0394978 | A1* | 12/2023 | Ayhan | G08G 5/22 |
| 2023/0396919 | A1* | 12/2023 | Ayhan | H04R 3/005 |
| 2024/0418133 | A1* | 12/2024 | Swann | F02C 9/40 |
| 2025/0163855 | A1* | 5/2025 | Ayhan | G06Q 10/0631 |
| 2025/0165005 | A1* | 5/2025 | Ayhan | B64D 45/00 |
| 2025/0166515 | A1* | 5/2025 | Ayhan | G06N 20/20 |

OTHER PUBLICATIONS

European Patent Office, Extended European Search Report Issued in Application No. 24210601.1, Apr. 9, 2025, 9 pages.

Gracia-Berná, A. et al., "Data-driven models for accurate estimation of fuel consumption using Deep Learning techniques," Proceedings of the 2023 IEEE/AIAA 42nd Digital Avionics Systems Conference (DASC 2023) , Oct. 1, 2023, Barcelona, Spain, 10 pages.

M. A. , Wahid. et al., "Parametric estimation scheme for aircraft fuel consumption using machine learning," Nerual Computing and Applications, vol. 35, Sep. 16, 2023, 22 pages.

* cited by examiner

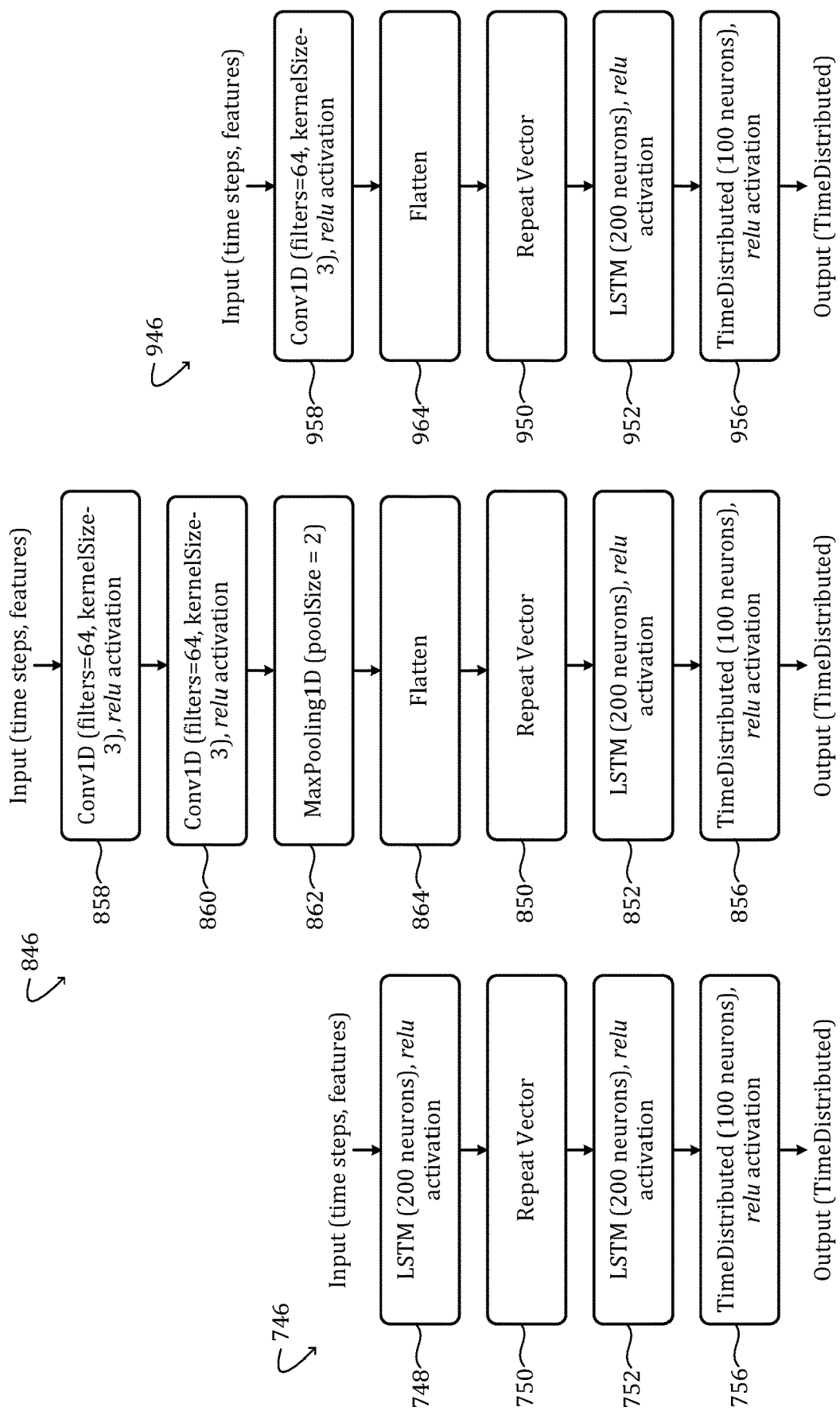

PREDICTING FUEL BURN AND EMISSIONS FOR AIRCRAFT

CROSS REFERENCE TO RELATED APPLICATIONS

This application claims priority to U.S. Provisional Patent Application Ser. No. 63/600,995, filed Nov. 20, 2023, the entirety of which is hereby incorporated herein by reference for all purposes.

TECHNICAL FIELD

This disclosure relates generally to commercial aviation and more particularly to predicting the fuel consumption and carbon-dioxide emissions of an aircraft via machine learning.

BACKGROUND

The economic and environmental costs of air travel vary directly with fuel consumption by aircraft along pre-selected flight paths. Only by accurate prediction of the fuel consumption can these costs be minimized while maintaining desired air-travel capacity. Accurate aircraft-emissions prediction may also facilitate improved industry responsiveness to growing concern over climate change, as commercial air transport is a major contributor to global carbon-dioxide emissions.

SUMMARY

One aspect of this disclosure relates to a method for fueling an aircraft. The method comprises (a) predicting a sequence of fuel-burn quantities over a planned flight based on at least one sequence of multivariate flight data recorded during a prior flight and on a hidden state of a trained machine. For each of a pre-selected series of prior flights, a corresponding sequence of multivariate flight data recorded during the prior flight is processed in a trainable machine to develop the hidden state, which minimizes an overall residual for replicating the fuel-burn quantities in each corresponding sequence. The method further comprises (b) summing the fuel-burn quantities over the planned flight to obtain a fueling estimate; and (c) fueling the aircraft based in part on the fueling estimate.

This Summary is provided in order to introduce in simplified form a selection of concepts that are further described in the Detailed Description. This Summary is not intended to identify key features or essential features of the claimed subject matter, nor is it intended to be used to limit the scope of the claimed subject matter. The claimed subject matter is not limited to implementations that solve any disadvantages noted in any part of this disclosure.

BRIEF DESCRIPTION OF THE DRAWINGS

FIGS. 7 through 9 show aspects of example long short-term memory (LSTM) machine-learning architectures for making fuel-burn and emissions predictions for aircraft flight.

DETAILED DESCRIPTION

1. Introduction

Figure 1:
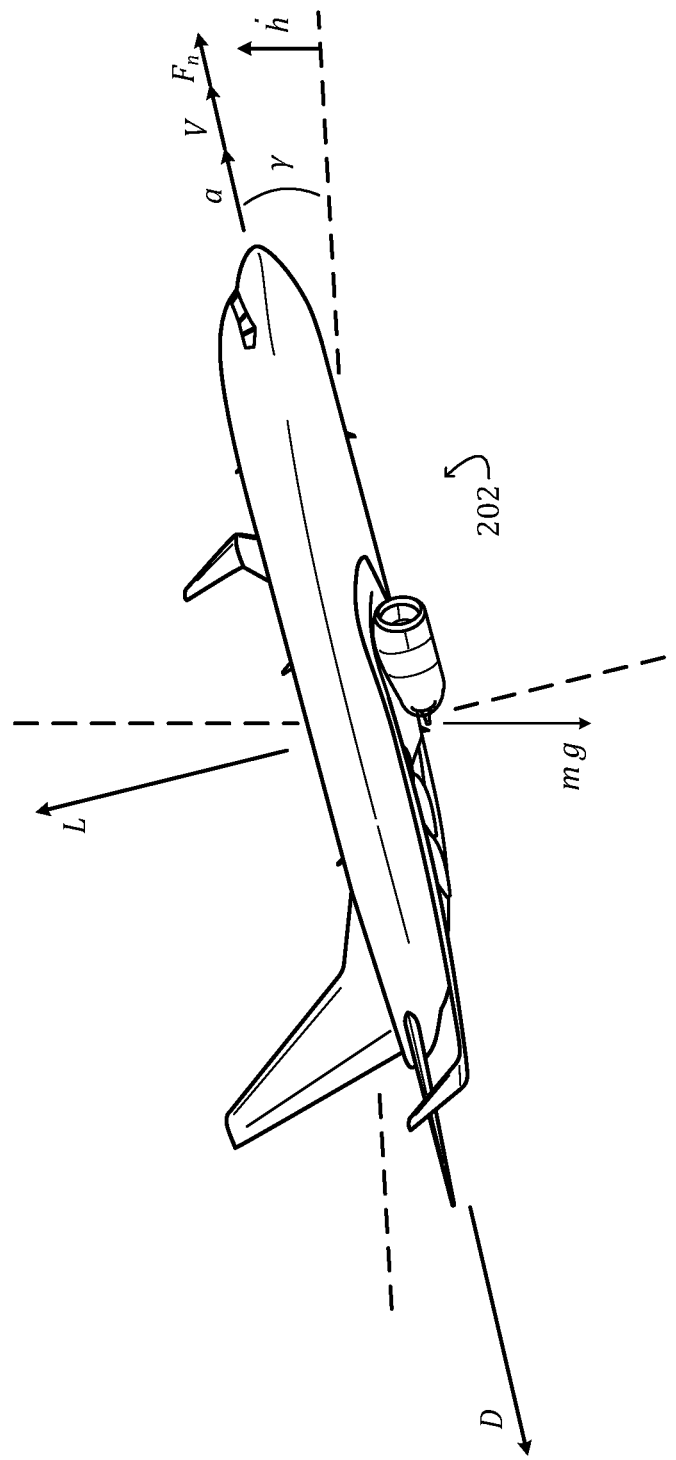
FIG. 1 schematically shows aspects of flight dynamics for an example aircraft.

The operating cost of an aircraft correlates directly to the quantity of fuel it consumes. In the aviation industry that quantity is called 'fuel burn'. Fuel burn also correlates directly to emissions of carbon dioxide, nitrogen oxides, ozone, and acoustic noise from an aircraft, all of which have adverse impacts on climate and health. Thus, economic and environmental factors provide, in parallel, strong motivation to limit fuel burn in commercial aviation. Meeting that objective systematically requires the ability to predict fuel burn on a flight-by-flight basis, with acceptable accuracy.

State-of-the-art fuel-burn prediction tools compute the distance between departure and arrival airports, select an aircraft type, and invoke an Aircraft Performance Model (APM) to estimate the fuel burn. The fuel-burn estimate can then be converted into various emissions estimates. It is well-known, for instance, that every kilogram (kg) of aircraft fuel which is burned releases 3.16 kg of carbon dioxide.

Some APMs derive the necessary data from non-operational sources such as flight manuals, performance calculators, or look-up tables. Some APMs use simplified parametric equations that capture neither the physical underpinnings nor the operational complexities of aviation. Some APMs are deterministic and unable, therefore, to reflect variability in flight conditions and aircraft operation. More particularly, some state-of-the-art fuel-burn prediction tools rely on data banks and performance and approximation models, such as Aircraft Engine Emissions Databank by International Civil Aviation Organization, which provides point estimates of the values of fuel-flow rates. Another tool widely used to simulate aircraft performance is the BADA, developed by EUROCONTROL, which uses data from different airplane manufacturers and airlines.

To simulate aircraft performance, BADA uses a total energy model to calculate performance parameters, such as net thrust and thrust-specific fuel consumption (TSFC). Generally speaking, BADA APMs are built using data from nominal aircraft operations, which may differ from actual operations. Furthermore, BADA provides point estimates of the fuel burn without any uncertainty estimates to quantify operational variability in the fuel-flow rate.

Research on machine learning for aircraft fuel-burn prediction is limited. Chati et al. (2017) restricts the independent variables to those obtained from trajectory data and proposes Gaussian process regression (GPR) to estimate fuel burn.

To address these issues and provide further advantages, this disclosure presents a deep-learning, data-driven, stochastic tool for aircraft fuel-burn prediction on a flight-by-flight basis. The fuel-burn prediction is defined as a sequence-learning problem, where it is assumed that fuel burn can be described as a function of time-resolved flight-data recorder (FDR) and atmospheric data. Given a set of prior flights of varying lengths, with such data provided, the trained model predicts fuel burn at every time step along a planned flight. In some examples the model employs an encoder-decoder (E-D) long short-term memory (LSTM) architecture. An encoder is used to map an input sequence of multivariate flight data to a vector representation of fixed length; a decoder is used to transform the vector representation into the target fuel-burn sequence.

LSTM models are recurrent neural networks, which demonstrate excellent performance in sequence-to-sequence learning tasks involving variable-length input. That aspect is believed to be significant for fuel-burn prediction, as flight lengths always vary, even for nominally equivalent flights between the same departure and arrival airports. In order to predict fuel-burn efficiently, each flight can be divided into climb, cruise, and descent phases, with one model built for each phase. The disclosed training method reflects considerable effort in feature engineering, culling initial sequences of over 2500 parameters recorded at the 1 Hz FDR frequency during each flight. In validating the disclosed models, real-world operational data was used in a walk-forward validation scheme, and the models were ranked based on performance.

Experiments show that the disclosed solutions significantly outperform state-of-the-art fuel-burn prediction tools, offering up to 50% improvement in total fuel-burn prediction error. An added benefit is that the predictions can be made prior to fueling, thereby limiting the initial weight of the aircraft and further reducing the fuel consumption and emissions. These solutions can be used by airlines to compare fuel consumption along different routes and for different aircraft, thereby facilitating a systematic approach to reducing operating costs and emissions.

2. Data Description

Informally known as 'the black box', an FDR is an instrument on-board a commercial aircraft, which periodically records approximately 2,500 inboard and outboard readings of numerous sensors during every flight. FDR data is considered to be one of the most accurate and confidential sources of operational flight data. The FDR data used herein comprised 9,643 routine passenger-carrying flights on Boeing 787-9 aircraft, which occurred during a 38-month period from January 2017 to February 2020. Table 1 shows the set of international air routes used herein—viz., six major, international air routes, over which the flights took place. The FDR data is in the form of a time-varying multivariate sequence, recorded at a 1-second time interval. As Overall, the FDR data include parameters such as the aircraft trajectory (a sequence of position data), aircraft configuration (landing gear, flap, and aileron position), various speeds (air, ground, and vertical climb speed), various angles (pitch, roll, and flight path angle), various readings for each engine (thrust, and fuel flow rate), as well as outboard readings, such as outside air temperature and pressure, etc., each as a function of time during the flight.

TABLE 1

A set of international air routes used in this disclosure.

| # | Departure Airport | Arrival Airport |
|---|---|---|
| 1 | London Gatwick Airport | Boston Logan Int'l Airport |
| 2 | | JFK Int'l Airport |
| 3 | | Seattle Tacoma Int'l Airport |

TABLE 1-continued

A set of international air routes used in this disclosure.

| # | Departure Airport | Arrival Airport |
|---|---|---|
| 4 | Boston Logan Int'l Airport | London Gatwick Airport |
| 5 | JFK Int'l Airport | |
| 6 | Seattle Tacoma Int'l Airport | |

The meteorology data used herein was obtained from the National Oceanic and Atmospheric Administration's Global Forecasting System, to complement the outboard readings of the FDR data. The meteorology data contains over 40 weather parameters for atmospheric, cloud, and ground attributes for each spatiotemporal aircraft position, as part of its 3D weather model.

3. Feature Engineering

Feature engineering is the process of using domain knowledge of data to identify features that efficiently represent the underlying problem of a predictive model. Sound feature engineering can reduce over-parameterization and improve a model's accuracy on unseen data. Before selecting the 'salient' features, using machine-learning algorithms such as principal component analysis (PCA), the underlying physics governing aircraft operations was reviewed, in order to identify the most pertinent variables. Comparing these variables with the arrived-at salient features enables validation.

3.1 Variables of Flight Dynamics. FIG. 1 shows aspects of simplified dynamic forces on an aircraft 202 in flight. The pertinent forces are used to compute $F_n$, the aircraft net thrust from all engines, $$F_n = qSC_{D_0} + \frac{C_{D_2}m^2g^2}{qS} - \frac{C_{D_2}m^2g^2\dot{h}^2}{qSV^2} + mg\sin\gamma + ma. \quad \text{(Eq. 1)}$$

In this equation, q is the dynamic pressure, S is the reference wing area, $C_{D_0}$ and $C_{D_2}$ are the aircraft drag coefficients, m is the aircraft gross mass, g is the acceleration due to gravity, $\dot{h}$ is the vertical speed, V is the true air speed, $\gamma$ is the flight path angle, and a is the aircraft acceleration in the thrust direction. In addition, L is the lift on the aircraft, which is denoted as $L = mg\cos\gamma$.

As in the BADA model, the fuel flow rate can be defined in terms of TSFC as follows, $$\dot{m}_f = \frac{T\dot{S}FC * F_n}{N_{eng}}, \quad \text{(Eq. 2)}$$

where $\dot{m}_f$ is the fuel flow rate for each engine and $N_{eng}$ is the number of engines. The fuel-flow rate for each engine can be approximated using the aforementioned variables, $$\dot{m}_f \approx \dot{m}_f\left(qS, m, \frac{\dot{h}}{V}, a, C_{D_0}, C_{D_2}, TSFC\right). \quad \text{(Eq. 3)}$$

3.2 Features of FDR and Atmospheric Data. Due to the great variety of parameters and repetitive nature of inboard and outboard sensor readings for the same phenomenon under different parameter names, dimensionality reduction was enacted on the FDR data. To reduce the number of input variables, the FDR data was filtered and cleansed by identifying repetitive, blank, or extremely sparse set of fields. Subsequent PCA identified 27 salient features which represented 99% of the model's accuracy. It is believed that the 27 salient features contain all critical variables included in the flight dynamics. Table 2 lists the salient features and the dependent variable.

TABLE 2

Salient features and the dependent variable.

| Group | Feature | Type | Description | Applicable Flight Phase |
|---|---|---|---|---|
| Flight | airline | Categorical | Air carrier | Climb, cruise, descent |
| | arrAirport | Categorical | Arrival airport | Climb, cruise, descent |
| | deptAirport | Categorical | Departure airport | Climb, cruise, descent |
| | tailNo | Categorical | Tail number | Climb, cruise, descent |
| Aircraft Config. | aircraftType | Categorical | Aircraft type | Climb, cruise, descent |
| | engineType | Categorical | Engine type | Climb, cruise, descent |
| | flapPos | Numerical | Flap position in degrees | Climb, descent |
| | landingGear | Categorical | Landing gear up or down | Climb, descent |
| | outAileronPos | Numerical | Outboard aileron position in degrees | Climb, descent |
| | spoilerPos | Numerical | Spoiler position in degrees | Climb, descent |
| | weight | Numerical | Gross weight at departure in pounds | Climb, cruise, descent |
| Spatial | altitude | Numerical | Pressure altitude in feet | Climb, cruise, descent |
| | heading | Numerical | Magnetic heading in degrees | Climb, cruise, descent |
| | latitude | Numerical | Latitude in degrees | Climb, cruise, descent |
| | longitude | Numerical | Longitude in degrees | Climb, cruise, descent |
| | path | Numerical | Flight path angle in degrees | Climb, cruise, descent |
| | pitch | Numerical | Pitch angle in degrees | Climb, cruise, descent |
| | roll | Numerical | Roll angle in degrees | Climb, cruise, descent |
| Temporal | dateTime | Ordinal | UTC date/time | Climb, cruise, descent |
| Meteorological | airTemp | Numerical | Outside air temperature in Celsius | Climb, cruise, descent |
| | pressure | Numerical | Atmospheric pressure in hectopascals | Climb, cruise, descent |
| | windDir | Numerical | Atmospheric wind direction in degrees | Climb, cruise, descent |
| | windSpeed | Numerical | Wind speed in knots | Climb, cruise, descent |
| Combinatorial | flightPathAccel | Numerical | Flight path acceleration in g-force | Climb, cruise, descent |
| | fuelFlow | Numerical | Fuel flow in pounds per hour, dependent variable | Climb, cruise, descent |
| | mach | Numerical | Mach number | Climb, cruise, descent |
| | trAirSpeed | Numerical | True air speed in knots | Climb, cruise, descent |
| | vertClimbSpeed | Numerical | Vertical climb speed in knots | Climb, cruise, descent |

Figure 2:
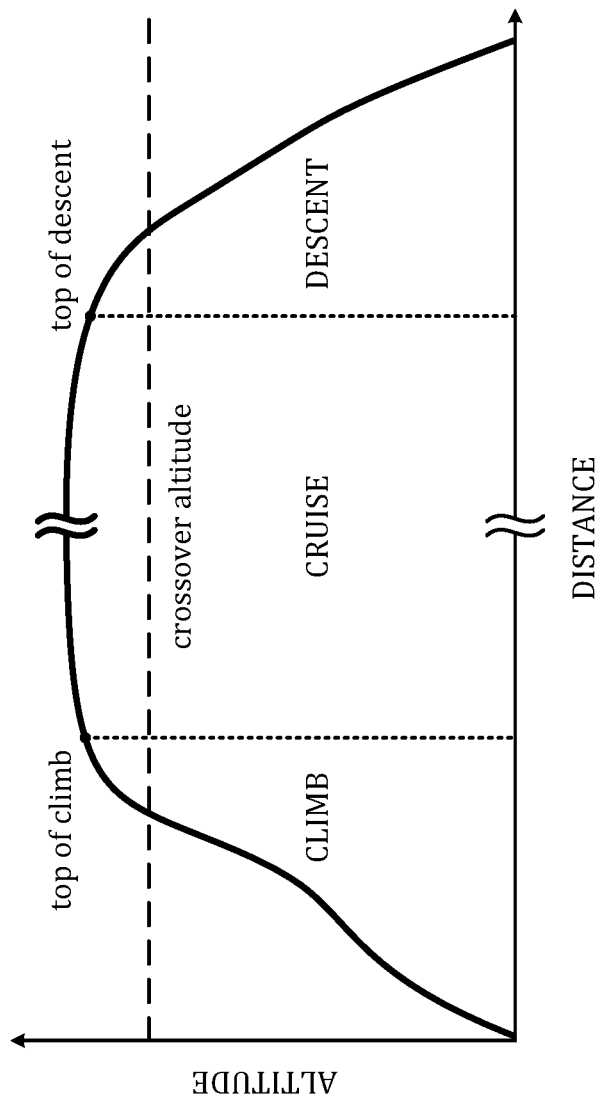
FIG. 2 schematically shows the climb, cruise, and descent phases of an example flight.

Before analysis, each flight profile was divided into a climb phase, a cruise phase, and a descent phase, as represented in FIG. 2. The climb phase extends from takeoff from the departure airport to the top-of-climb, where the cruise phase begins. The cruise phase is typically marked by long periods of level altitude. The descent phase extends from the end of the cruise phase to touchdown and landing.

Figure 3A:
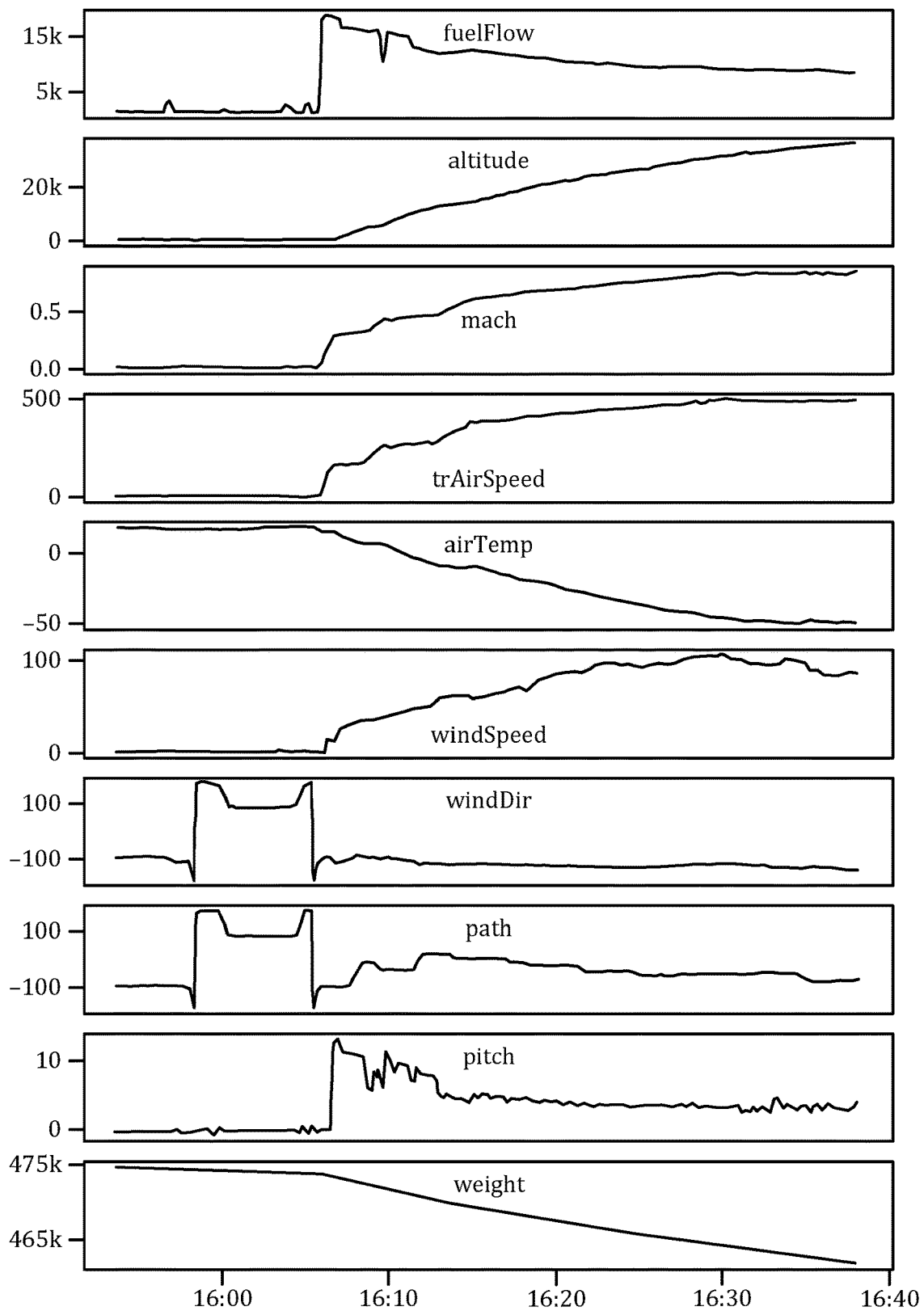
FIGS. 3A through 3C show plots of selected measurements recorded as a function of time during the climb, cruise, and descent phases of an example flight.
Figure 3B:
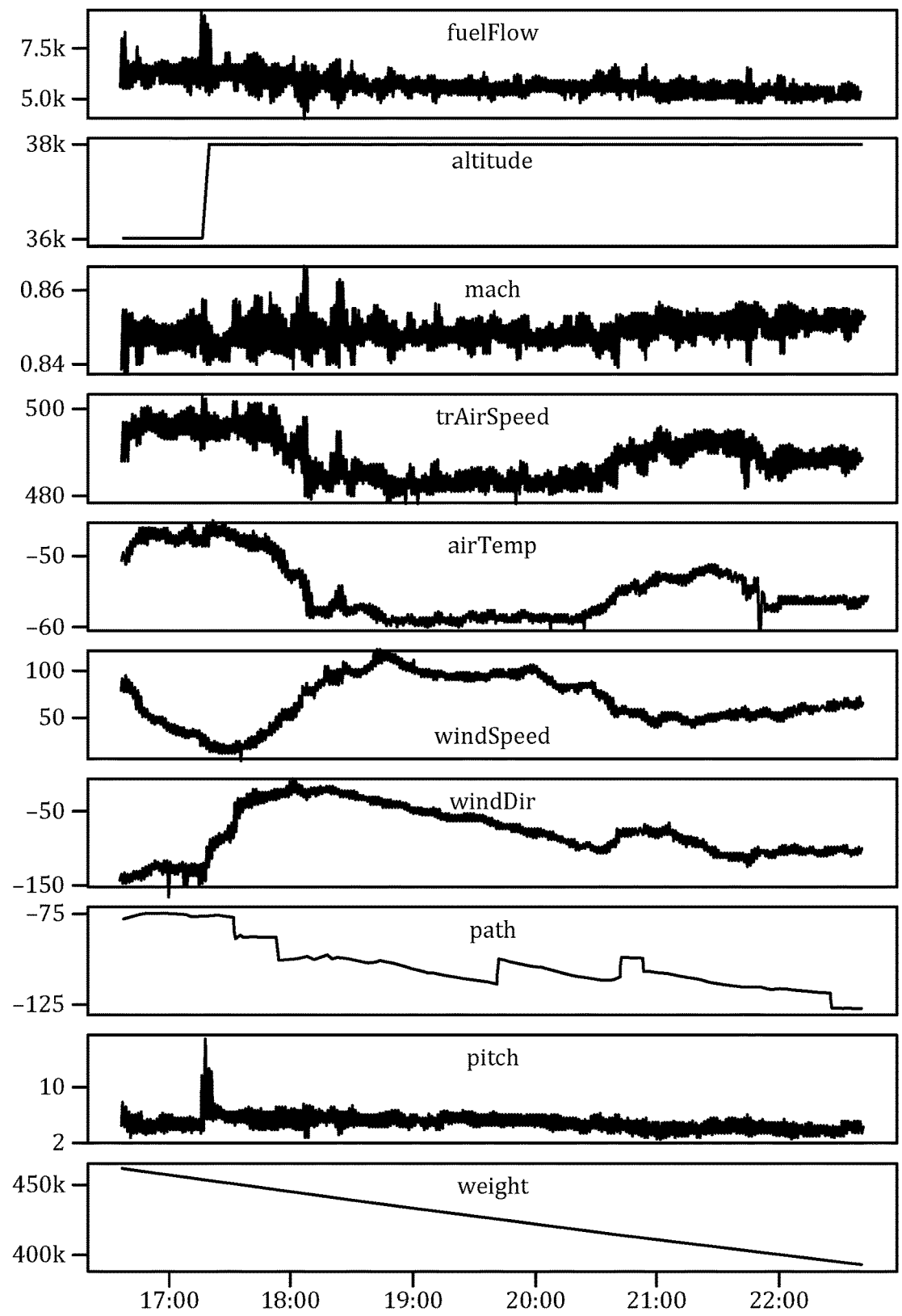
Figure 3C:
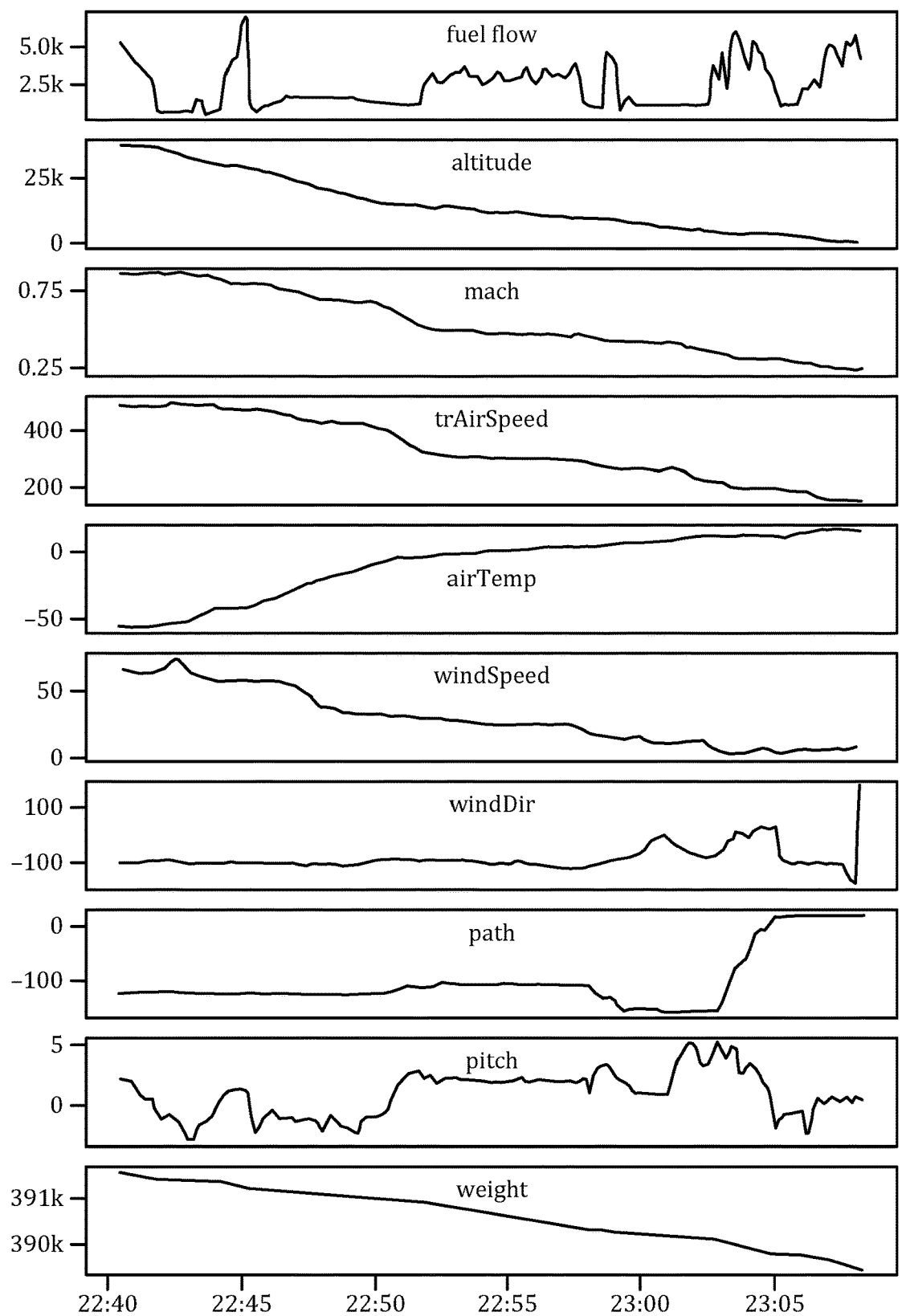

The plots in FIGS. 3A through 3C show the various salient features and the dependent variable as functions of time during each phase of an example flight between London Gatwick and Boston Logan International Airport on 13 Oct. 2019. It appears that the aircraft is still on the runway during approximately the first 10 minutes of the flight, where altitude, Mach, true airspeed, wind speed and pitch values are at minimum levels, and outside air temperature and weight are at maximum levels. Furthermore, it appears that the aircraft moves on the runway, as the flight path angle and wind direction fluctuate before the takeoff. It is evident that the fuel flow is at its maximum level during the takeoff and gradually decreases as the aircraft climbs. Between the takeoff and the top-of-climb, the aircraft gradually increases its altitude, Mach, and true airspeed levels, and decreases its weight due to fuel consumption.

The similarity between the distribution patterns of pitch angle and fuel flow is remarkable during all phases of the flight, particularly during the climb phase. As the aircraft cruises, its altitude reaches a peak and then levels off, while the weight continues to decrease steadily. The fluctuating levels of fuel flow during the descent phase are also remarkable, making it more challenging to predict the fuel flow. Indeed, examination of the salient features plotted over time provides numerous insights.

4. Problem Statement and Model Review

Given a set of prior flights with associated FDR and atmospheric data, the training objective is to train a model that predicts fuel burn for another flight before it departs. To address this problem, a flight is defined as a sequence of sensor readings at a particular frequency. A 'sequence' is a set of values in a specified order; herein the values are ordered according to ascending or descending time. In some examples the time step between adjacent values in a sequence is fixed. This type of sequence can also be called a 'time series'. If the flight time is 8 hours and the frequency of the sensor readings is 1 Hz, then, for all sensors the flight is defined by 28800 time steps, with one reading recorded for each sensor at each time step. Due to the observed variation in flight time, even between fixed departure and arrival airports, the historical FDR data has varying length for each flight and flight phase. Accordingly, the models here disclosed must address a multivariate, multi-step sequence prediction problem for the climb, cruise, and descent phases of a flight. To that end, the sequence of flight phases in varying lengths is adjusted, for each route, into a sequence of flight phases in fixed length. This was achieved by padding the shorter sequences. The process for a single flight phase is presented in Algorithm 1.

---

Algorithm 1: Adjusting sequences of varying length flight phases into sequences of fixed-length flight phases.

---

Result: Sequences of a flight phase in fixed length.
Input: Sequences of a flight phase in variable length F $v_c$.
Output: Sequences of a flight phase in fixed length F $f_c$.
1   $Fv_c \leftarrow [fv_1, fv_2, \ldots, fv_k]$
2   $len_c \leftarrow$ sortAndFilter(len($Fv_c$))
3   foreach $fv_c \in Fv_c$ do
4   | while len($fv_c$) ≤ $len_c$ do
5   | | len($fv_c$) ← len($fv_c$) + 1
6   | end
7   | return $fv_c$
8   end

---

4.1 Encoder-Decoder LSTM. Sequence prediction often involves predicting the next value in a sequence, which can be framed as a sequence prediction problem of one input time step to one output time step, or, multiple input time steps to one output time step. A more challenging problem, however, is to take a sequence as input and to return another, predicted sequence as output. This is a sequence-to-sequence (seq2seq) prediction problem, and it is made more challenging when the length of the input and output sequences can vary. An effective approach to seq2seq prediction problems is the E-D LSTM architecture. The system comprises two cooperative models—an encoder for reading the input sequence and encoding it into a fixed-length vector, and a decoder for decoding the fixed-length vector and outputting the predicted sequence.

Consider a sequence $X = \{x^{(1)}, x^{(2)}, \ldots, x^{(L)}\}$ of length L, where each point $x^{(i)} \in \mathbb{R}^m$ is an m-dimensional vector of readings for m variables at time-instance $t_i$. This translates to a scenario in which a flight includes L time steps, where, at each time step $t_i$, m sensor readings are recorded. In one example, an E-D LSTM model is trained to reconstruct instances of the recorded fuel burn. The LSTM encoder learns a fixed length vector representation of the input sequence, and the LSTM decoder uses this representation to reconstruct the output sequence using the current hidden state and the value predicted at the previous time-step.

Given X, $h_E^{(i)}$ is the hidden state of the encoder at time $t_i$ for each $i \in \{1, 2, \ldots, L\}$, where $h_E^{(i)} \in \mathbb{R}^c$, and c is the number of LSTM units in the hidden layer of the encoder. The encoder and decoder are jointly trained to reconstruct the time-series in reverse order, i.e., the target time-series is $\{x^{(L)}, x^{(L-1)}, \ldots, x^{(1)}\}$. The final state hg of the encoder is used as the initial state for the decoder. A linear layer on top of the LSTM decoder layer is used to predict the target.

During training, the decoder uses $x^{(i)}$ as input to obtain the state $h_D^{(i-1)}$, and then predict $x'^{(i-1)}$ corresponding to target $x^{(i-1)}$. During inference, the predicted value $x'^{(i)}$ is input to the decoder to obtain $h_D^{(i-1)}$ and predict $x'^{(i-1)}$. The model is trained to minimize the objective $$\sum_{X \in s_N} \sum_{i=1}^{L} \|x^{(i)} - x'^{(i)}\|^2, \qquad \text{(Eq. 4)}$$

where $s_N$ is the set of training sequences.

Figure 4:
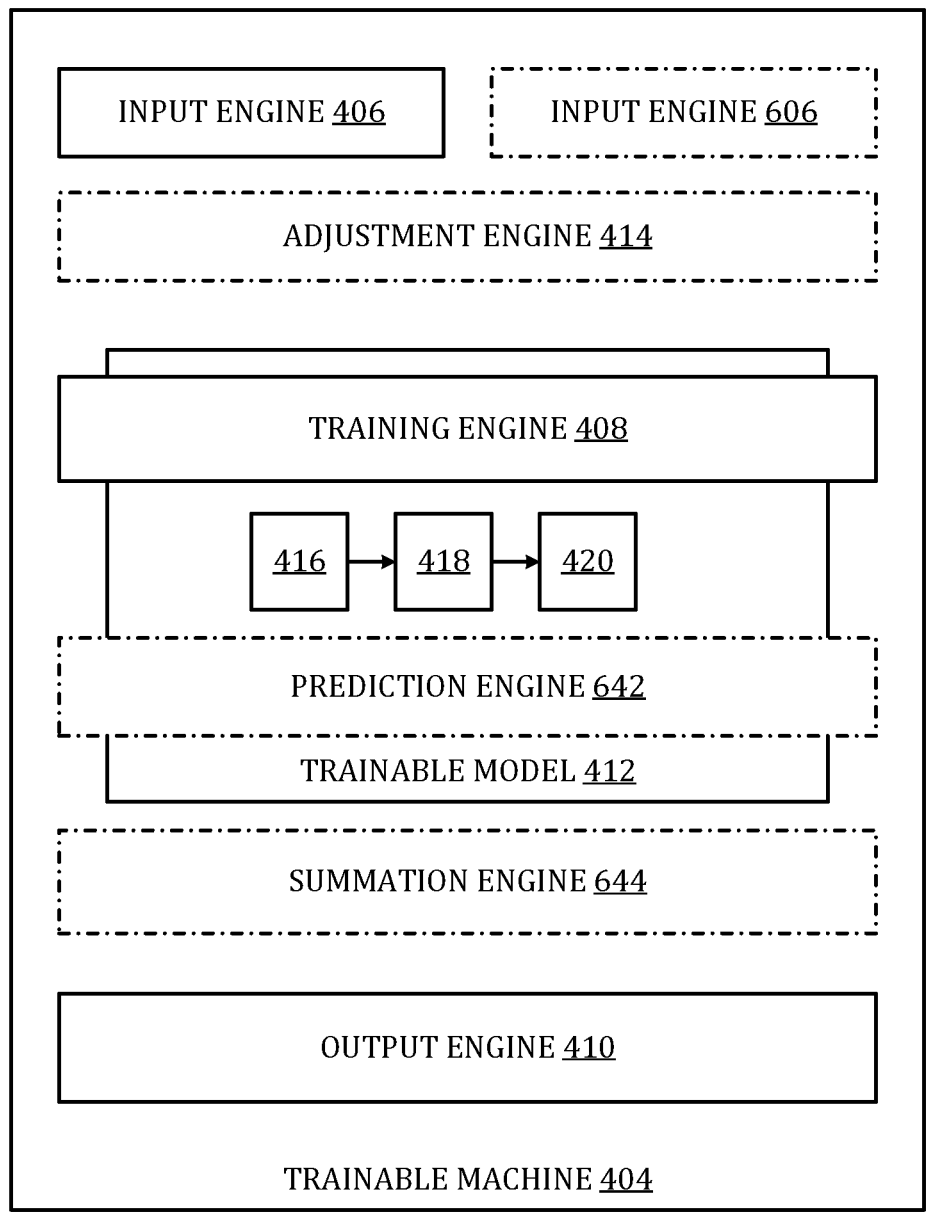
FIG. 4 shows aspects of an example machine trainable to make fuel-burn and emissions predictions for aircraft flight.

In this spirit, FIG. 4 shows aspects of an example machine 404 trainable to make fuel-burn and emissions predictions for aircraft flight. The trainable machine includes, inter alia, an input engine 406, a training engine 408, an output engine 410, and a trainable model 412.

Input engine 406 is configured to receive training data for each of a pre-selected series of prior flights. The training data comprises, for each prior flight of the series, a corresponding sequence of multivariate flight data that was recorded during the prior flight. In some examples each corresponding sequence includes FDR data selected via principle-component analysis, as noted above. In some examples each corresponding sequence includes atmospheric data.

In some examples, for each of the pre-selected series of prior flights, the corresponding sequence spans a climb phase, a cruise phase, and/or a descent phase of the prior flight. In examples where the corresponding sequences are segmented in that way, the trainable machine may further comprise an adjustment engine 414. When included, the adjustment engine may be configured to adjust each corresponding sequence to provide a common climb length for the climb phase, a common cruise length for the cruise phase, and/or a common descent length for the descent phase. In some examples and scenarios, adjusting each corresponding sequence comprises padding the corresponding sequence in the climb phase, the cruise phase, and/or the descent phase. A given phase can be padded according to Algorithm 1, for instance. In some examples and scenarios, adjusting each corresponding sequence may include trimming. In examples in which the flight is not divided into distinct phases, such padding and/or trimming may be enacted for each flight as a whole.

Training engine 408 is configured to process each corresponding sequence of multivariate flight data according to a trainable model 412. As described herein, such processing develops incrementally a hidden state in the trained model. When fully developed, the hidden state is one that minimizes an overall residual for replicating the fuel-burn quantities in each corresponding sequence. As noted hereinabove, replicating the fuel-burn quantities comprises transforming the multivariate flight data from a previous time step in each corresponding sequence, based on the hidden state.

In some examples trainable model 412 comprises a trainable encoder 416 arranged logically upstream of a trainable decoder 418. The encoder is trainable to emit a vector that featurizes an input sequence of multivariate flight data; the decoder is trainable to replicate the fuel-burn quantities of the input sequence based on the vector, thereby generating an output sequence. The number of parameters included in the input sequence may vary from one example to another. In some examples the twenty-seven parameters from Table 2 may be included. In other examples, other parameters, additional parameters, or fewer parameters may be used. Generally speaking, models trained for specific routes and specific aircraft may be capable of making accurate predictions based on fewer input parameters than more generally applicable models.

In some examples the encoder and the decoder are configured according to a long short-term memory (LSTM) architecture. In some examples the trainable model comprises an encoder-decoder LSTM (E-D LSTM) model, as shown in FIG. 7; a convolutional neural-network (CNN) LSTM encoder-decoder (CNN LSTM E-D) model, as shown in FIG. 8; or a convolutional LSTM encoder-decoder (ConvLSTM E-D) model, as shown in FIG. 9. In some examples the trainable model further comprises a fully connected layer 420 configured to interpret the fuel burn quantities at each time step of the output sequence before the final output layer. More particularly, the fully connected layer may be the penultimate layer of the trainable model. The fully connected layer may be configured to feed the output layer (vide infra), which predicts a single step in the output sequence (not all L steps at once). By way of illustration, consider a flight comprising a series of time steps, each separated by ten minutes. In the output layer the fuel-flow amount may be predicted as a series {120, 1130, 2142, . . . }, where the first number, 120, corresponds to the amount of fuel burned in the first time step (e.g., from 0 to 1 minute), the second number corresponds to the amount of fuel burned in the first two time steps (e.g., 0 to 11 minutes), the third number corresponds to the amount of fuel burned in the first three time steps (e.g., 0 to 21 minutes), and so on.

Output engine 410 is configured to expose at least a portion of the hidden state of trainable model 412, as developed by training. The manner of 'exposure' of the portion of the hidden state may vary from one implementation to the next. In particular, this disclosure contemplates a scenario in which one computer system receives and processes training data for a great many prior flights and is then tasked to make predictions based on the hidden state developed therein. In other words the trainable machine, after development of the hidden state is the trained machine. In this scenario, exposure means only that the portion of the hidden state required for the predictions is made available to a prediction engine (vide infra). For instance, the data structure holding the weights and coefficients characterizing the hidden state may be scoped in a way that enables access by the prediction engine. This disclosure also contemplates a scenario in which the computer system that receives and processes the training data is distinct from one or more computer systems tasked with making the predictions. In other words, the trainable machine may be distinct from the trained machine. In that scenario, exposure of the portion of the hidden state means that the weights and coefficients required for predictions are communicated from the computer system that has processed the training data to the one or more computer systems tasked with making the predictions.

Figure 5:
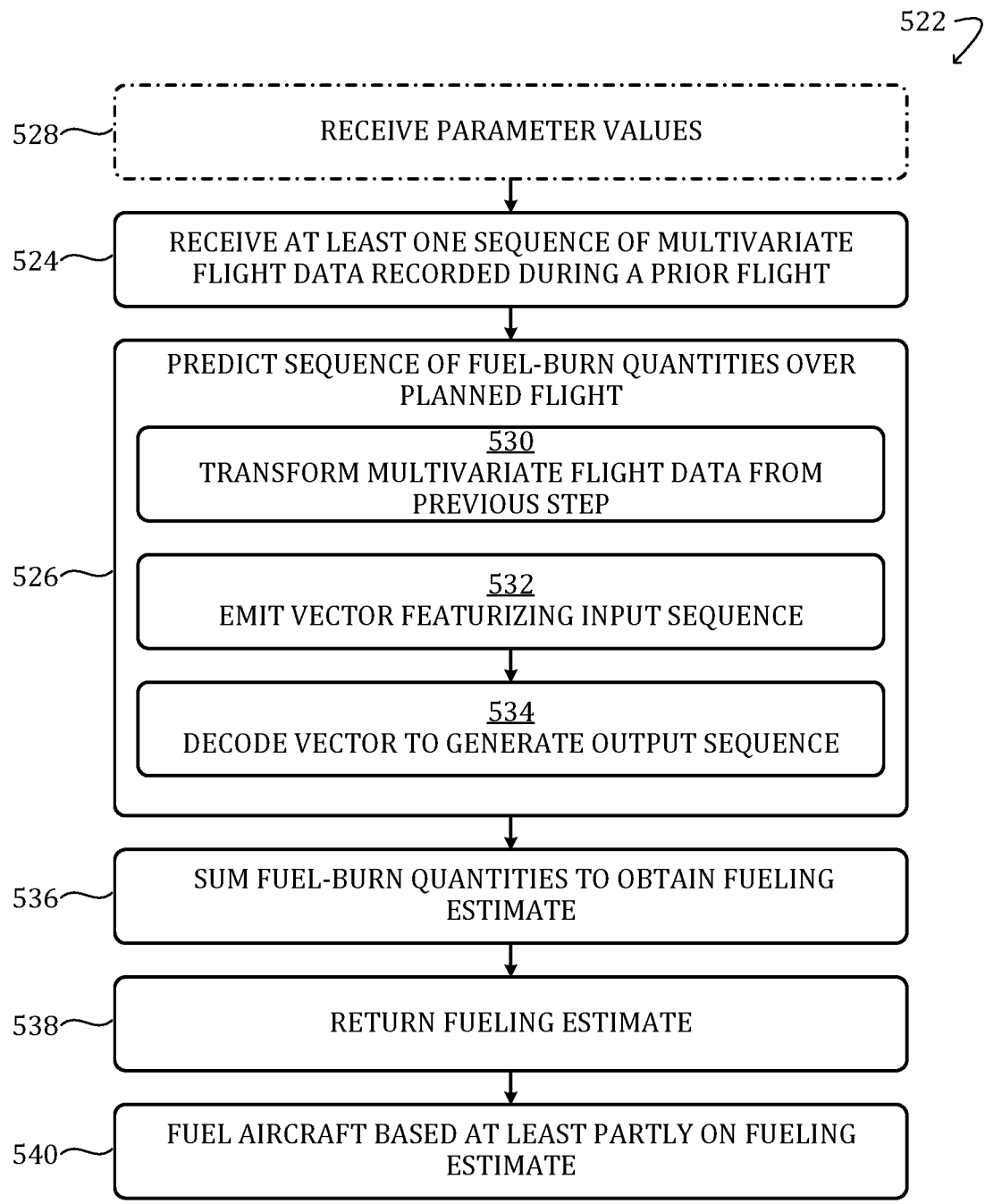
FIG. 5 shows aspects of an example method for fueling an aircraft in advance of a planned flight.

After appropriate training, trainable machine 404, or another trained machine, can be used to make fuel-burn and emissions predictions for aircraft flight. Such predictions can be incorporated into other useful methods. FIG. 5 shows aspects of an example method 522 for fueling an aircraft in advance of a planned flight.

At 524 of method 522, a trained machine receives at least one sequence of multivariate flight data as input. The number of input sequences received is not particularly limited. Each input sequence comprises flight data recorded during a prior flight that shares at least some features of the planned flight. In some examples the at least one sequence of multivariate flight data share the departure airport, the arrival airport, and the aircraft model of the planned flight. In some examples the at least one sequence of multivariate flight data comprises data which is analogous to the training data hereinabove. Such data may include FDR data selected via PCA analysis, for instance. In some examples the at least one sequence of multivariate flight data includes atmospheric (e.g., weather) data. In other examples the input data may comprise fewer parameters than the training sequences. For instance, a suitable model may be trained for a specific airline, specific aircraft type, and specific departure and arrival airports. In that case, fewer parameters would be required for predicting fuel burn than in a more generic model.

In one, non-limiting example, consider the objective of predicting fuel burn and emissions for a flight on a given airline on 26 Feb. 2024, between JFK and London Gatwick airport, for a Boeing 787-9 aircraft. To make that prediction, the at least one sequence of multivariate flight data may comprise the last ten flights (i.e., from 16 Feb. 2024 through 25 Feb. 2024) or the last five flights (i.e., from 21 Feb. 2024 through 25 Feb. 2024). Alternatively, the input may comprise three flights with the past 10 years (e.g., on 26 Feb. 2021, 26 Feb. 2022, and 26 Feb. 2021). Numerous other variants of the at least one sequence of multivariate flight data are equally envisaged and may be provided as input.

At 526 the trained machine predicts a sequence of fuel-burn quantities over the planned flight. In other words, in a flight (or portion of a flight) characterized by N time steps, a distinct fuel-burn prediction is made for each of the N time steps. The prediction is based on the at least one input sequence and on a hidden state of the trained machine. During training, as noted above, a corresponding sequence of multivariate flight data recorded during each of a preselected series of prior flights is processed in a trainable machine to develop the hidden state. The hidden state is a state that minimizes an overall residual for replicating the fuel-burn quantities in each corresponding sequence. In examples in which the trainable machine is distinct from the trained machine, a plurality of parameter values defining the hidden state as developed on the trainable machine may be received in advance of the prediction—e.g., at 528 of method 522. As noted above, predicting the sequence of fuel-burn quantities comprises transforming, at 530, the multivariate flight data from a previous time step in the at least one sequence based on the hidden state. To that end, an encoder, at 532, may emit a vector featurizing the input sequence. At 534 a decoder may decode the vector to generate the output sequence.

At 536 the trained machine sums the fuel-burn quantities over the planned flight to obtain a fueling estimate (e.g., a single value) for the planned flight. At 538 the fueling estimate is returned by the trained machine to the object or other calling procedure requesting the fueling estimate.

At 540 the aircraft is fueled based in part on the fueling estimate. In some examples a flight-specific margin of safety is added to the fueling estimate to determine the level to which the aircraft is fueled prior to takeoff. The margin may be computed based on factors such as proximity to friendly airports along the flight path, whether the flight is over land or water, etc.

Figure 6:
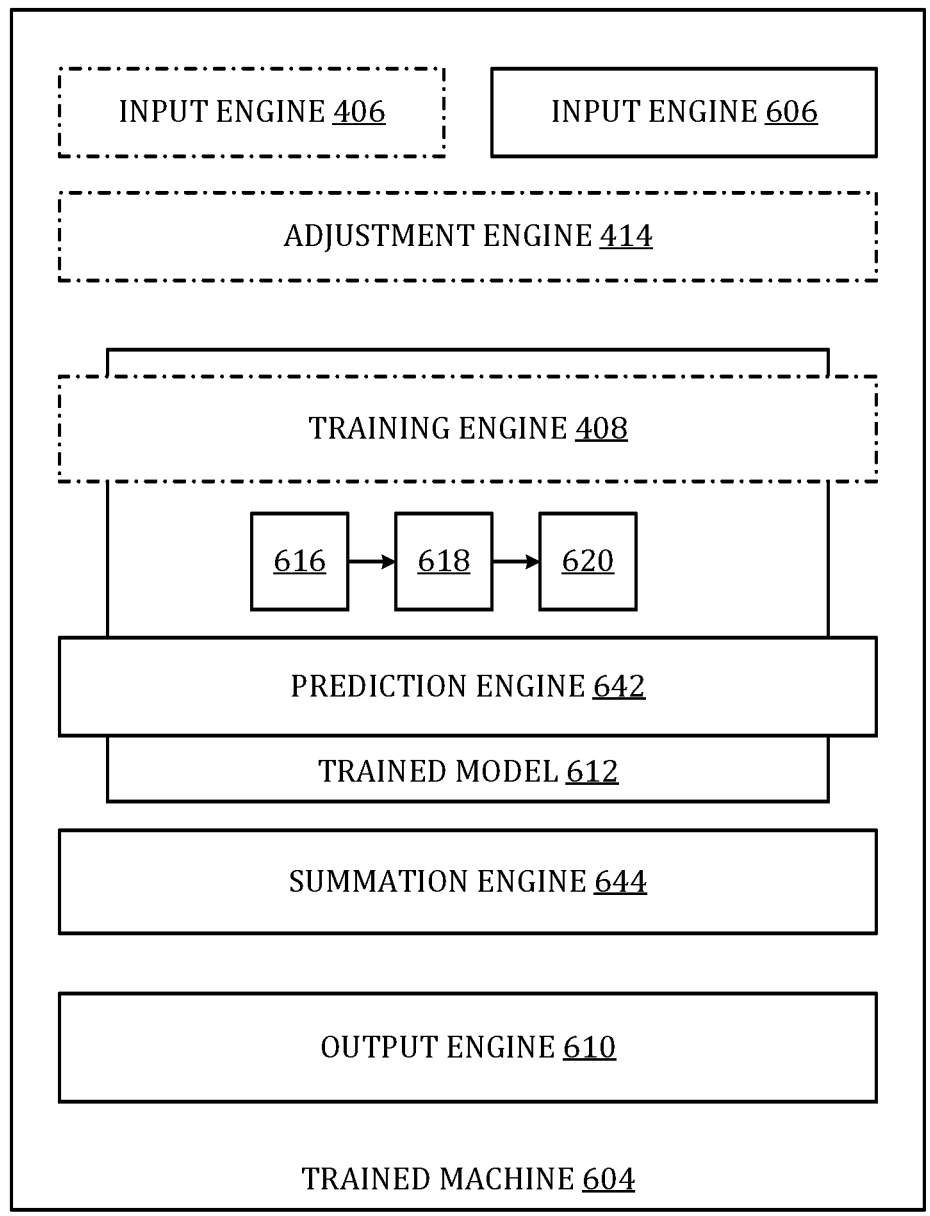
FIG. 6 shows aspects of an example machine trained to make fuel-burn and emissions predictions for aircraft flight.

FIG. 6 shows aspects of an example machine 604 trained to make fuel-burn and emissions predictions for aircraft flight. The trained machine includes, inter alia, an input engine 606, a prediction engine 642, a summation engine 644, an output engine 610, and a trained model 612. In the illustrated example, the trained machine also includes an optional input engine 406, training engine 408, and adjustment engine 414; these optional engines, if included, may provide functions analogous to the corresponding engines of trainable machine 404.

Input engine 606 is configured to receive at least one sequence of multivariate flight data recorded during a prior flight, as described in the context of method 522. Prediction engine 642 is configured to predict a sequence of fuel-burn quantities over a planned flight based on at least one sequence of multivariate flight data recorded during a prior flight and on a hidden state of the trained machine. Again, the manner of prediction is described as in method 522.

In some examples trained model 612 comprises a trained encoder 616 arranged logically upstream of a trained decoder 618. The encoder is trained to emit a vector that featurizes an input sequence of multivariate flight data; the decoder is trained to replicate the fuel-burn quantities of the input sequence based on the vector, thereby generating an output sequence. In some examples the encoder and the decoder are configured according to a long short-term memory (LSTM) architecture. In some examples the trained model comprises an encoder-decoder LSTM (E-D LSTM) model, as shown in FIG. 7; a convolutional neural-network (CNN) LSTM encoder-decoder (CNN LSTM E-D) model, as shown in FIG. 8; or a convolutional LSTM encoder-decoder (ConvLSTM E-D) model, as shown in FIG. 9. In some examples the trained model further comprises a fully connected layer 620 configured to interpret the fuel burn quantities at each time step of the output sequence before the final output layer. In some examples the fully connected layer may be the penultimate layer of the trained model.

Summation engine 644 is configured to sum the fuel-burn quantities over the planned flight, to obtain a fueling estimate as described above. Output engine 610 is configured to output the fueling estimate. In some examples the output engine is further configured to output an emissions estimate based on the fueling estimate. For instance, the output engine may multiply the fuel burn estimate (in mass units) by 3.16 to output a carbon-dioxide emissions estimate.

No aspect of the drawings or description should be interpreted in a limiting sense, because numerous variations, extensions, and omissions are equally envisaged. In one extension, the planned flight hereinabove may be one of a plurality of candidate flights of a plurality of candidate routes between a departure airport and an arrival airport. Method 522, in that case, may further comprise for each of the plurality of candidate flights, predicting a sequence of fuel-burn quantities over the candidate flight based on at least one sequence of multivariate flight data recorded during a prior flight and on the hidden state of the trained machine, and summing the fuel-burn quantities over the candidate flight to obtain a flight-wise fueling estimate. For each of the plurality of candidate routes, every flight-wise fueling estimate along the candidate route may be summed to obtain a route-wise fueling estimate for the candidate route. In this extension the planned flight may be 'planned' because it is a necessary leg on the route having the lowest route-wise fueling estimate.

5. Experimental Evaluation 5.1 Setup. The performance of the prediction models was evaluated on a total of 9,643 flights over the six major international routes presented in Table 1. To keep the sequence length of each flight phase manageable, the data was down-sampled from one sample per second to one sample per minute. The dataset was normalized and standardized; the first 80% was used for modeling and validation and the remaining 20% for testing.

An E-D LSTM model was built, followed by two variants: a convolutional neural network (CNN) LSTM encoder-decoder (CNN LSTM E-D) model, and a convolutional LSTM (ConvLSTM) encoder-decoder (ConvLSTM E-D) model. When building these models, a grid search was done to select the best performing configuration. The evaluation method used a walk-forward validation scheme, where the model was used to make a prediction for a single flight phase formed by L time steps. The actual data for that flight phase was then made available to the model so that it could be used as the basis for making a prediction on the subsequent flight. Due to the stochastic nature of the models, each model was evaluated multiple times; the mean performance is reported herein. Given the fuel burn for the n most recent flights with the same input values, fuel burn is predicted for the next flight, provided that all flights share the same features.

The disclosed models were compared with a baseline model—a simple, naive prediction that takes stepwise the fuel burn for each previous flight and uses it as the value of the stepwise fuel burn for the current flight. Further, an Autoregressive Integrated Moving Average (ARIMA) model was built for comparative evaluation. ARIMA captures various temporal structures in time-series data by combining autoregressive, integrated, and moving average aspects.

Further still, the disclosed models were compared against the BADA model, the most widely used model in commercial aviation today. To build the BADA model, instructions were followed for the fuel determination process for a jet aircraft. Engine thrust and fuel coefficients were computed for climb, descent, and cruise phases on the same dataset. The BADA performance parameters such as wing reference area, Mach number, maximum take-off weight, etc., were obtained from the Boeing Company. To compute temperature and pressure ratios used in the BADA model, International Standard Atmosphere parameters (temperature, pressure, density) as functions of altitude, as provided by Cavcar (2000), were used. Finally, ten-fold cross-validation was undertaken, and the models were evaluated according to root mean square error (RMSE) as well as mean absolute percentage error (MAPE) metrics.

As shown in FIG. 7, E-D LSTM model 746 comprises an encoder 748 that reads the input sequence and outputs a vector which captures features from the input sequence. The number of time steps L was varied depending upon the duration of a flight phase, which defines the fixed length as input. The internal representation of the input sequence is repeated multiple times at repeat layer 750 and presented to LSTM decoder 752. Consistent with the description hereinabove, model 746 may comprise a fully connected layer to interpret each time step in the output sequence before the final output layer. Notably, the output layer predicts a single step in the output sequence, not all L steps at once. To that end, the interpretation layer and the output layer are wrapped in a TimeDistributed wrapper 756, which allows the wrapped layers to be used for each time step from decoder 752. More particularly, the TimeDistributed wrapper may create a fully connected (e.g., dense) layer applied separately to each time step. Stated equivalently, the TimeDistributed wrapper may apply the same dense operation to every time step of a 3D tensor. This enables the LSTM decoder to figure out the context required for each step in the output sequence, and the wrapped, dense layers to interpret each time step separately, but reusing the same weights to perform the interpretation.

In CNN LSTM E-D model 846, as shown in FIG. 8, first and second CNN layers 858 and 860 act as the encoder. The first CNN layer 858 reads across the input sequence and projects the results onto feature maps. The second CNN layer 860 performs the same operation on the feature maps created by the first CNN layer, attempting to amplify any salient features. The max pooling layer 862 simplifies the feature maps by keeping the one quarter of the values having maximum signal. The distilled feature maps, downstream of the max pooling layer, are flattened in flattening layer 864 into one long vector, which after repetition in repeat layer 850, is used as input to the decoding process. The decoder is another LSTM hidden layer 852, which is followed by a TimeDistributed wrapper 856 that feeds the output layer.

The motivation for ConvLSTM E-D model 946 of FIG. 9 was to leverage the ability of a CNN to read the input sequence data as part of the LSTM for each time step. In particular, ConvLSTM uses CNN layer 958 to read the input into the LSTM units. ConvLSTM is a type of recurrent neural network for spatio-temporal prediction that provides convolutional structures in both the input-to-state and state-to-state transitions. The ConvLSTM determines the future state of a certain cell in the grid by the inputs and past states of its local neighbors. In this variant, CNN layer 958 is arranged logically upstream of flattening layer 964, repeat layer 950, LSTM decoder 952 and TimeDistributed layer 956. All of the disclosed models, including E-D LSTM, CNN LSTM E-D and ConvLSTM E-D, were compiled using adam optimizer and mse loss function and fit for 50 training epochs with a batch size of 16.

Figure 10A:
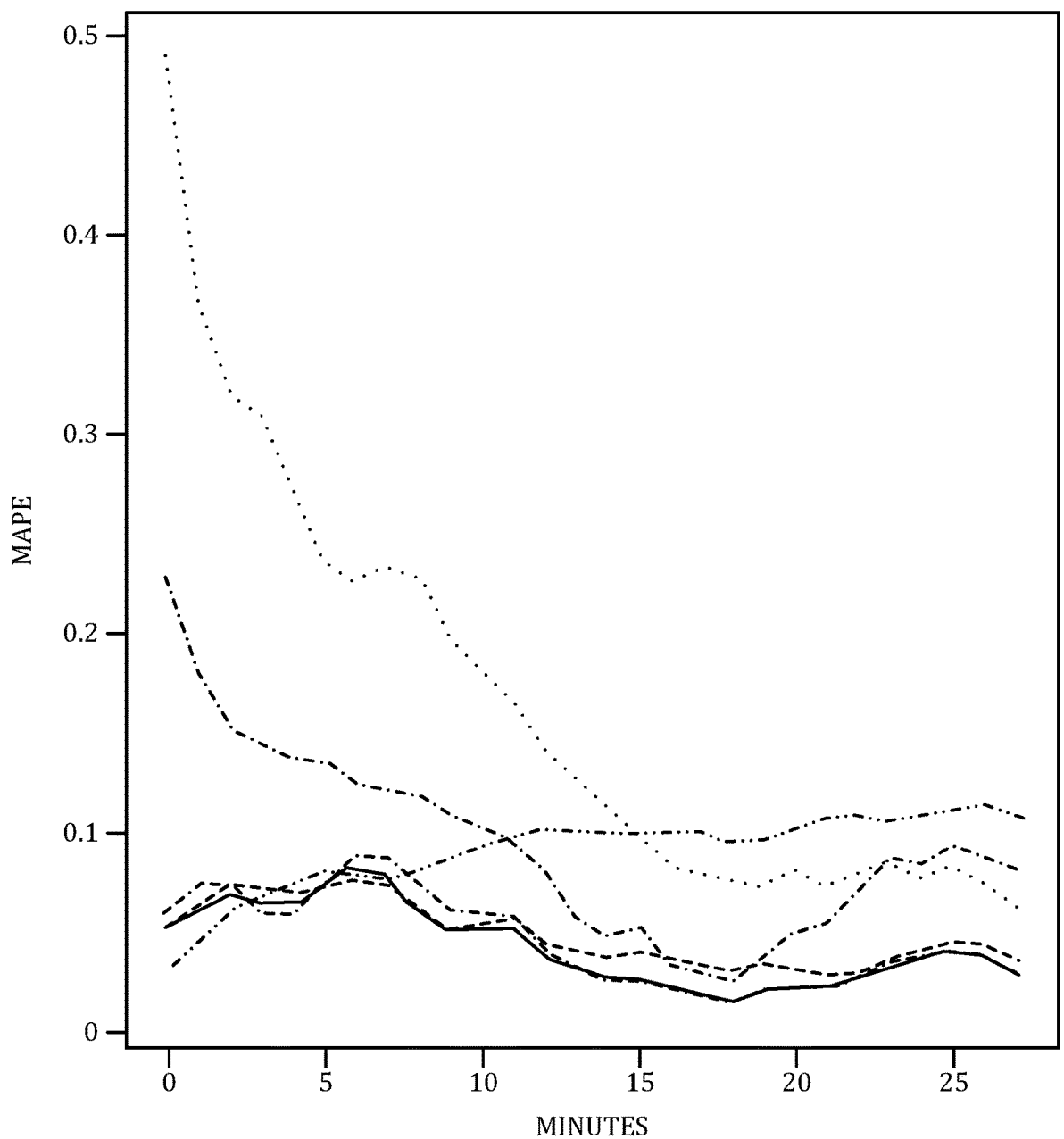
FIGS. 10A through 10C show plots of mean absolute percentage error (MAPE) versus time for fuel-burn prediction according to the models evaluated herein.
Figure 10B:
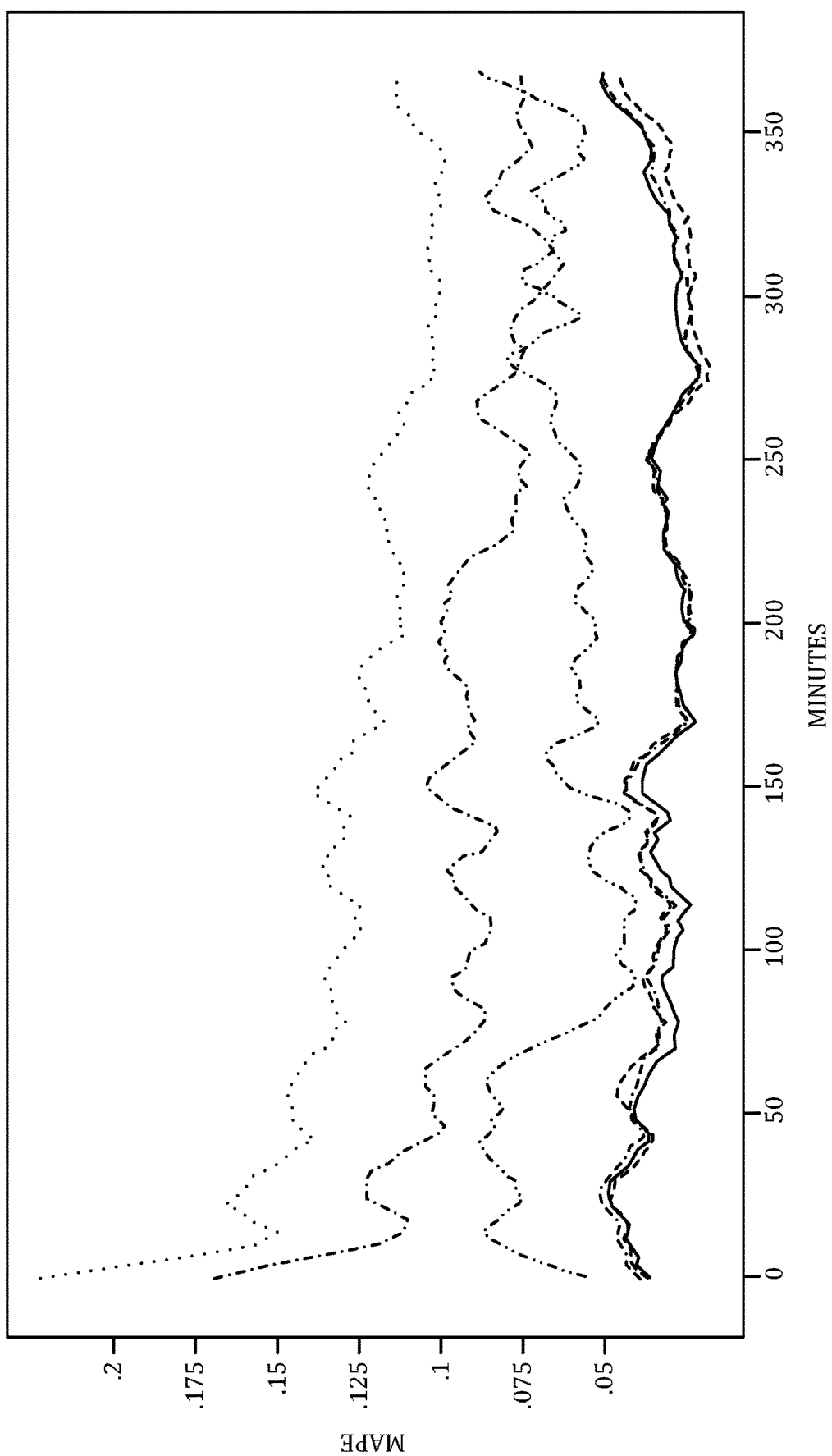
Figure 10C:
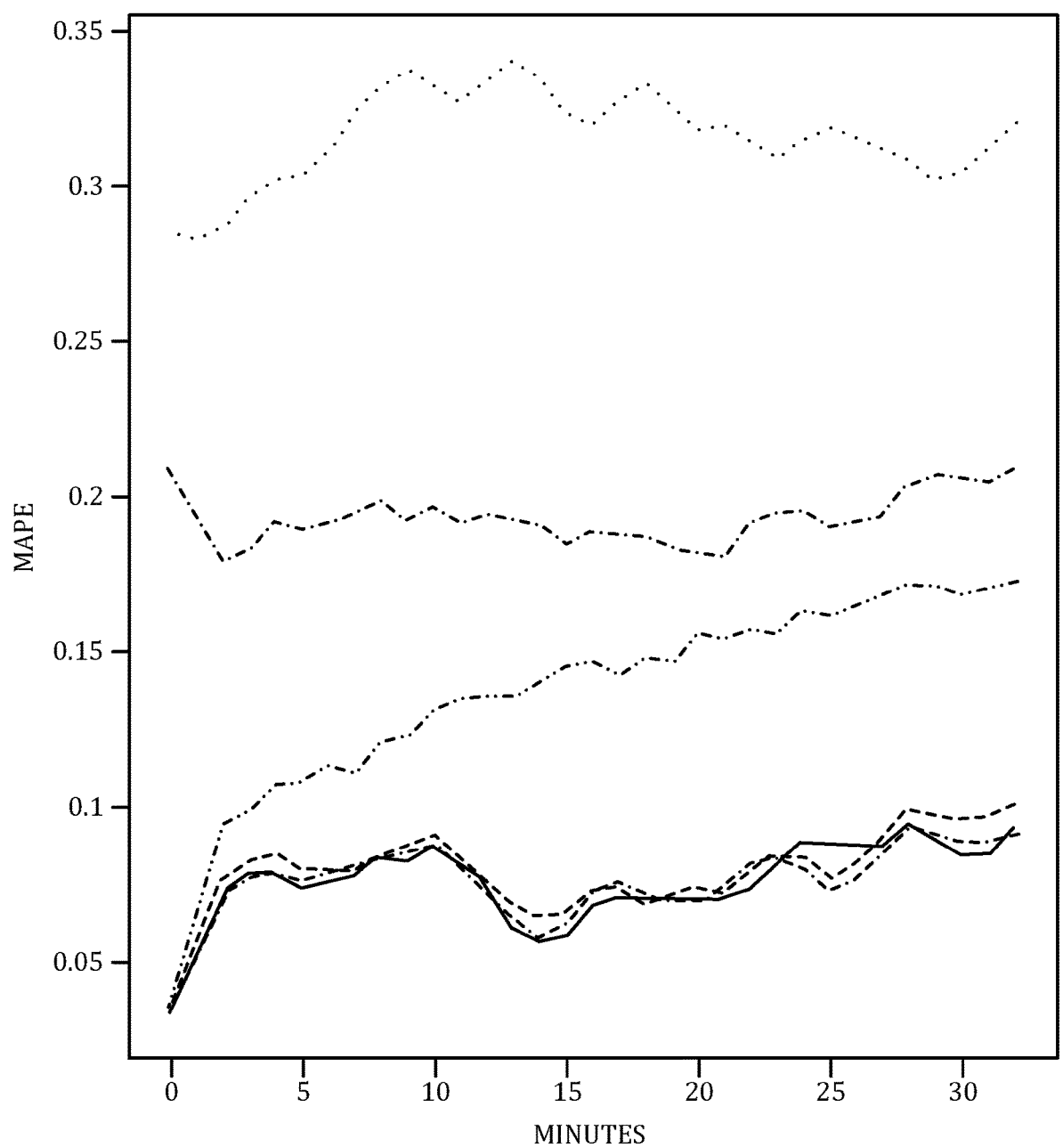

5.2 Results. The plots in FIGS. 10A through 10C show MAPE over time during the climb, cruise, and descent phases of all of the flights between London Gatwick airport and Boston Logan International airport herein. In these plots, the dotted line corresponds to the NAIVE predictor; the dot-dashed line corresponds to ARIMA; the double-dot dashed line corresponds to BADA; the solid line corresponds to E-D LSTM; the double-dashed dotted line corresponds to CNN LSTM E-D; and the dashed line corresponds to ConvLSTM E-D. Irrespective of the flight phase, the lowest MAPE values are achieved by the E-D LSTM model and its two variants. Although the BADA model outperforms the NAIVE and ARIMA models overall, its increasing MAPE over time is notable, particularly during the climb and descent phases. This is due to the fact that fuel burn is calculated in a stepwise manner in the BADA model, so the error generated in the current time step contributes to the aircraft weight of the next time step, which, in turn, is used to calculate the fuel burn in the following time step. Thus, the errors grow over time. The decreasing MAPE over time for the NAIVE and ARIMA models, particularly during the climb and cruise phases, is also notable.

Table 3 presents MAPE for each model on all routes in Table 1, on a phase-by-phase basis. It appears that the MAPE for the cruise phase is lower than the MAPE for the other phases among all models. This is because fuel consumption is typically stable during the cruise phase, making it less challenging to accurately model. The MAPE for the descent phase is higher than for other phases regardless of the model, making it the most challenging phase to model.

TABLE 3

MAPE for each flight phase over all air routes.

|  | Climb | Cruise | Descent | Overall |
|---|---|---|---|---|
| Naïve | 0.16464 | 0.12462 | 0.31601 | 0.20176 |
| ARIMA | 0.09332 | 0.09088 | 0.19291 | 0.12570 |

TABLE 3-continued

MAPE for each flight phase over all air routes.

|  | Climb | Cruise | Descent | Overall |
|---|---|---|---|---|
| BADA | 0.09044 | 0.06295 | 0.13693 | 0.09677 |
| E-D LSTM | 0.04264 | 0.03245 | 0.07614 | 0.05041 |
| CNN LSTM E-D | 0.04581 | 0.03387 | 0.07686 | 0.05218 |
| ConvLSTM E-D | 0.04843 | 0.03264 | 0.07935 | 0.05347 |

The performance of the models was also compared using RMSE in kg per hour. From the results presented in Table 4, showing RMSE (kg/hr) for air routes 1 through 3, it was observed that, although the E-D LSTM is the top ranking model, all of the new models here disclosed outperform the BADA model, reducing RMSE by up to 50%. This was consistent with the MAPE of Table 3.

TABLE 4

RMSE (kg/hr) for air routes 1 to 3.

|  | Route1 | Route2 | Route3 |
|---|---|---|---|
| NAIVE | 1078.19 | 1099.02 | 1111.59 |
| ARIMA | 683.37 | 689.81 | 697.19 |
| BADA | 564.36 | 567.09 | 573.65 |
| E-D LSTM | 285.31 | 289.52 | 293.54 |
| CNN LSTM E-D | 297.16 | 303.39 | 311.13 |
| ConvLSTM E-D | 304.59 | 311.21 | 317.91 |

6. Computer System Description and Conclusion

Figure 11:
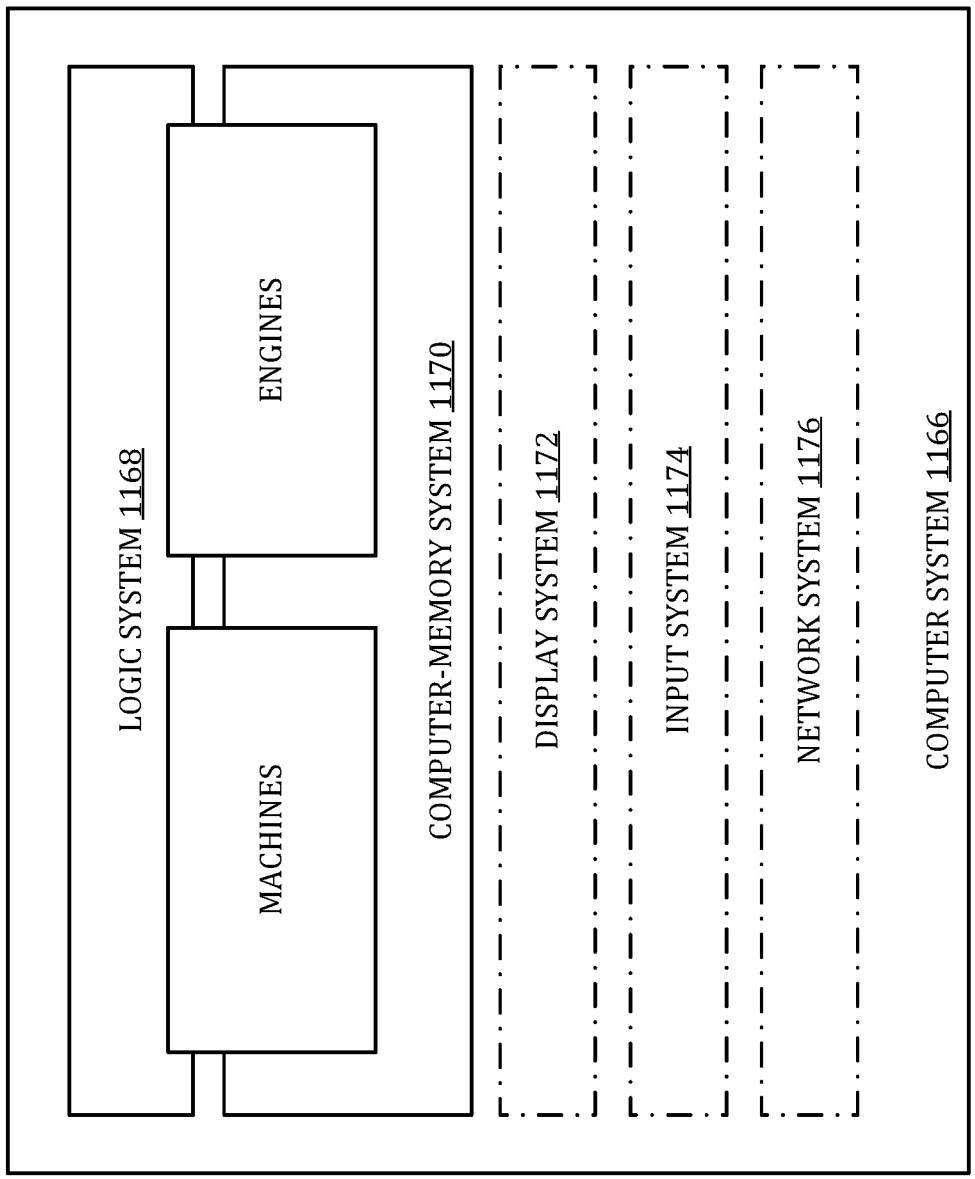
FIG. 11 schematically shows aspects of an example computer system.

FIG. 11 provides a schematic representation of a computer system 1166 configured to provide some or all of the computer functionality disclosed herein. Computer system 1166 may take the form of desktop, laptop, or tablet computer system, a smart phone, server system, or virtually any type of digital computer system.

Computer system 1166 includes a logic system 1168 and a computer-memory system 1170. Computer system 1166 may optionally include a display system 1172, an input system 1174, a network system 1176, and/or other systems not shown in the drawings.

Logic system 1168 includes one or more physical devices configured to execute instructions. For example, the logic system may be configured to execute instructions that are part of at least one operating system (OS), application, service, and/or other program construct. The logic system may include at least one hardware processor (e.g., microprocessor, central processor, central processing unit (CPU) and/or graphics processing unit (GPU)) configured to execute software instructions. Additionally or alternatively, the logic system may include at least one hardware or firmware device configured to execute hardware or firmware instructions. A processor of the logic system may be single-core or multi-core, and the instructions executed thereon may be configured for sequential, parallel, and/or distributed processing. Individual components of the logic system optionally may be distributed among two or more separate devices, which may be remotely located and/or configured for coordinated processing. Aspects of the logic system may be virtualized and executed by remotely-accessible, networked computing devices configured in a cloud-computing configuration.

Computer-memory system 1170 includes at least one physical device configured to temporarily and/or permanently hold computer system information, such as data and instructions executable by logic system 1168. When the computer-memory system includes two or more devices, the devices may be collocated or remotely located. Computer-memory system 1170 may include at least one volatile, nonvolatile, dynamic, static, read/write, read-only, random-access, sequential-access, location-read addressable, file-read addressable, and/or content-read addressable computer-memory device. Computer-memory system 1170 may include at least one removable and/or built-in computer-memory device. When the logic system executes instructions, the state of computer-memory system 1170 may be transformed—e.g., to hold different data.

Aspects of logic system 1168 and computer-memory system 1170 may be integrated together into one or more hardware-logic components. Any such hardware-logic component may include at least one program-or application-specific IC (PASIC/ASIC), program-or application-specific standard product (PSSP/ASSP), system-on-a-chip (SOC), or complex programmable logic device (CPLD), for example.

Logic system 1168 and computer-memory system 1170 may cooperate to instantiate one or more logic machines or engines. As used herein, the terms 'machine' and 'engine' each refer collectively to a combination of cooperating hardware, firmware, software, instructions, and/or any other components that provide computer system functionality. In other words, machines and engines are never abstract ideas and always have a tangible form. A machine or engine may be instantiated by a single computing device, or a machine or engine may include two or more subcomponents instantiated by two or more different computing devices. In some implementations, a machine or engine includes a local component (e.g., a software application executed by a computer system processor) cooperating with a remote component (e.g., a cloud computing service provided by a network of one or more server computer systems). The software and/or other instructions that give a particular machine or engine its functionality may optionally be saved as one or more unexecuted modules on one or more computer-memory devices.

Machines and engines (as used throughout the above description) may be implemented using any suitable combination of machine learning (ML) and artificial intelligence (AI) techniques. Non-limiting examples of techniques that may be incorporated in an implementation of one or more machines include support vector machines, multi-layer neural networks, convolutional neural networks (e.g., spatial convolutional networks for processing images and/or video, and/or any other suitable convolutional neural network configured to convolve and pool features across one or more temporal and/or spatial dimensions), recurrent neural networks (e.g., long short-term memory networks), associative memories (e.g., lookup tables, hash tables, bloom filters, neural Turing machines and/or neural random-access memory) unsupervised spatial and/or clustering methods (e.g., nearest neighbor algorithms, topological data analysis, and/or k-means clustering), and/or graphical models (e.g., (hidden) Markov models, Markov random fields, (hidden) conditional random fields, and/or AI knowledge bases)).

When included, display system 1172 may be used to present a visual representation of data held by computer-memory system 1170. The visual representation may take the form of a graphical user interface (GUI) in some examples. The display system may include one or more display devices utilizing virtually any type of technology. In some implementations, display system may include one or more virtual-, augmented-, or mixed reality displays.

When included, input system 1174 may comprise or interface with one or more input devices. An input device may include a sensor device or a user input device. Examples of user input devices include a keyboard, mouse, or touch screen.

When included, network system 1176 may be configured to communicatively couple computer system 1166 with one or more other computer systems. The network system may include wired and/or wireless communication devices compatible with one or more different communication protocols. The network system may be configured for communication via personal-, local- and/or wide-area networks.

Further, the disclosure comprises configurations according to the following examples.

Example 1. A method for fueling an aircraft, the method comprising: predicting a sequence of fuel-burn quantities over a planned flight based on at least one sequence of multivariate flight data recorded during a prior flight and on a hidden state of a trained machine, wherein for each of a pre-selected series of prior flights, a corresponding sequence of multivariate flight data recorded during the prior flight is processed in a trainable machine to develop the hidden state, which minimizes an overall residual for replicating the fuel-burn quantities in each corresponding sequence; summing the fuel-burn quantities over the planned flight to obtain a fueling estimate; and fueling the aircraft based in part on the fueling estimate.

Example 2. The method of Example 1 wherein, for each of the pre-selected series of prior flights, the corresponding sequence spans a climb phase, a cruise phase, and a descent phase of the prior flight.

Example 3. The method of Example 2 further comprising, for each of the pre-selected series of prior flights, adjusting the corresponding sequence to provide a common climb length for the climb phase, a common cruise length for the cruise phase, and/or a common descent length for the descent phase.

Example 4. The method of Example 3 wherein adjusting each corresponding sequence comprises padding the corresponding sequence in the climb phase, the cruise phase, and/or the descent phase.

Example 5. The method of Example 1, wherein replicating the fuel-burn quantities comprises transforming the multivariate flight data from a previous time step in each corresponding sequence based on the hidden state, and wherein predicting the sequence of fuel-burn quantities comprises transforming the multivariate flight data from a previous time step in the at least one sequence based on the hidden state.

Example 6. The method of Example 1 wherein at least the trained machine comprises a trained encoder arranged logically upstream of a trained decoder, wherein the encoder is trained to emit a vector that featurizes an input sequence of multivariate flight data, and wherein the decoder is trained to replicate the fuel-burn quantities of the input sequence based on the vector, thereby generating an output sequence.

Example 7. The method of Example 6 wherein the encoder and the decoder are configured according to a long short-term memory (LSTM) architecture.

Example 8. The method of Example 7 wherein at least the trained machine comprises an encoder-decoder LSTM (E-D LSTM) model, a convolutional neural-network (CNN) LSTM encoder-decoder (CNN LSTM E-D) model, or a convolutional LSTM encoder-decoder (ConvLSTM E-D) model.

Example 9. The method of Example 6 wherein at least the trained machine further comprises a fully connected layer configured to interpret the fuel burn quantities at each time step of the output sequence.

Example 10. The method of Example 1 wherein the at least one sequence and each corresponding sequence of multivariate flight data includes flight-data recorder (FDR) data selected via principle-component analysis.

Example 11. The method of Example 1 wherein the at least one sequence and each corresponding sequence of multivariate flight data includes atmospheric data.

Example 12. The method of Example 1 wherein the at least one sequence of multivariate flight data share a departure airport, an arrival airport, and an aircraft specifier of the planned flight.

Example 13. The method of Example 1 wherein the trainable machine, after development of the hidden state, is the trained machine.

Example 14. The method of Example 1 wherein the trainable machine is distinct from the trained machine, the method further comprising: receiving, in the trained machine, a plurality of parameter values defining the hidden state as developed on the trainable machine.

Example 15. The method of Example 1 wherein the planned flight is one of a plurality of candidate flights of a plurality of candidate routes between a departure airport and an arrival airport, the method further comprising: for each of the plurality of candidate flights: predicting a sequence of fuel-burn quantities over the candidate flight based on at least one sequence of multivariate flight data recorded during a prior flight and on the hidden state of the trained machine, and summing the fuel-burn quantities over the candidate flight to obtain a flight-wise fueling estimate; for each of the plurality of candidate routes, summing every flight-wise fueling estimate along the candidate route to obtain a route-wise fueling estimate for the candidate route, wherein the planned flight is a flight on the candidate route with a lowest route-wise fueling estimate.

Example 16. A trained machine comprising: an input engine configured to receive at least one sequence of multivariate flight data recorded during a prior flight; a prediction engine configured to predict a sequence of fuel-burn quantities over a planned flight based on at least one sequence of multivariate flight data recorded during a prior flight and on a hidden state of the trained machine, wherein for each of a pre-selected series of prior flights, a corresponding sequence of multivariate flight data recorded during the prior flight is processed in a trainable machine to develop the hidden state, which minimizes an overall residual for replicating the fuel-burn quantities in each corresponding sequence a summation engine configured to sum the fuel-burn quantities over the planned flight, to obtain a fueling estimate; and an output engine configured to output the fueling estimate.

Example 17. The machine of Example 16 wherein the output engine is further configured to output an emissions estimate based on the fueling estimate.

Example 18. A trainable machine comprising: an input engine configured to receive, for each of a pre-selected series of prior flights, a corresponding sequence of multivariate flight data recorded during the prior flight; a training engine configured to process each corresponding sequence to develop a hidden state, which minimizes an overall residual for replicating the fuel-burn quantities in each corresponding sequence; an output engine configured to expose at least a portion of the hidden state.

Example 19. The machine of Example 18 wherein each corresponding sequence includes flight-data recorder (FDR) data selected via principle-component analysis.

Example 20. The machine of Example 18 wherein for each of the pre-selected series of prior flights, the corresponding sequence spans a climb phase, a cruise phase, and a descent phase of the prior flight, the trainable machine further comprising: an adjustment engine configured to adjust each corresponding sequence to provide a common climb length for the climb phase, a common cruise length for the cruise phase, and a common descent length for the descent phase.

This disclosure is presented by way of example and with reference to the attached drawing figures. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

It will be understood that the configurations and/or approaches described herein are exemplary and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed. In that spirit, the phrase 'based at least partly on' is intended to remind the reader that the functional and/or conditional logic illustrated herein neither requires nor excludes suitable additional logic, executing in combination with the illustrated logic, to provide additional benefits.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for fueling an aircraft, the method comprising:

predicting a sequence of fuel-burn quantities over a planned flight based on at least one sequence of multivariate flight data recorded during a prior flight and on a hidden state of a trained machine,
wherein for each of a pre-selected series of prior flights, a corresponding sequence of multivariate flight data recorded during the prior flight is processed in a trainable machine to develop the hidden state, which minimizes an overall residual for replicating the fuel-burn quantities in each corresponding sequence;
summing the fuel-burn quantities over the planned flight to obtain a fueling estimate; and
fueling the aircraft based in part on the fueling estimate.

2. The method of claim 1 wherein, for each of the pre-selected series of prior flights, the corresponding sequence spans a climb phase, a cruise phase, and a descent phase of the prior flight.

3. The method of claim 2 further comprising, for each of the pre-selected series of prior flights, adjusting the corresponding sequence to provide a common climb length for the climb phase, a common cruise length for the cruise phase, and/or a common descent length for the descent phase.

4. The method of claim 3 wherein adjusting each corresponding sequence comprises padding the corresponding sequence in the climb phase, the cruise phase, and/or the descent phase.

5. The method of claim 1,
wherein replicating the fuel-burn quantities comprises transforming the multivariate flight data from a previous time step in each corresponding sequence based on the hidden state, and
wherein predicting the sequence of fuel-burn quantities comprises transforming the multivariate flight data from a previous time step in the at least one sequence based on the hidden state.

6. The method of claim 1 wherein at least the trained machine comprises a trained encoder arranged logically upstream of a trained decoder, wherein the encoder is trained to emit a vector that featurizes an input sequence of multivariate flight data, and wherein the decoder is trained to replicate the fuel-burn quantities of the input sequence based on the vector, thereby generating an output sequence.

7. The method of claim 6 wherein the encoder and the decoder are configured according to a long short-term memory (LSTM) architecture.

8. The method of claim 7 wherein at least the trained machine comprises an encoder-decoder LSTM (E-D LSTM) model, a convolutional neural-network (CNN) LSTM encoder-decoder (CNN LSTM E-D) model, or a convolutional LSTM encoder-decoder (ConvLSTM E-D) model.

9. The method of claim 6 wherein at least the trained machine further comprises a fully connected layer configured to interpret the fuel burn quantities at each time step of the output sequence.

10. The method of claim 1 wherein the at least one sequence and each corresponding sequence of multivariate flight data includes flight-data recorder (FDR) data selected via principle-component analysis.

11. The method of claim 1 wherein the at least one sequence and each corresponding sequence of multivariate flight data includes atmospheric data.

12. The method of claim 1 wherein the at least one sequence of multivariate flight data share a departure airport, an arrival airport, and an aircraft specifier of the planned flight.

13. The method of claim 1 wherein the trainable machine, after development of the hidden state, is the trained machine.

14. The method of claim 1 wherein the trainable machine is distinct from the trained machine, the method further comprising:
receiving, in the trained machine, a plurality of parameter values defining the hidden state as developed on the trainable machine.

15. The method of claim 1 wherein the planned flight is one of a plurality of candidate flights of a plurality of candidate routes between a departure airport and an arrival airport, the method further comprising:
for each of the plurality of candidate flights:
predicting a sequence of fuel-burn quantities over the candidate flight based on at least one sequence of multivariate flight data recorded during a prior flight and on the hidden state of the trained machine, and
summing the fuel-burn quantities over the candidate flight to obtain a flight-wise fueling estimate;
for each of the plurality of candidate routes, summing every flight-wise fueling estimate along the candidate route to obtain a route-wise fueling estimate for the candidate route,
wherein the planned flight is a flight on the candidate route with a lowest route-wise fueling estimate.

16. A trained machine comprising:
an input engine configured to receive at least one sequence of multivariate flight data recorded during a prior flight;
a prediction engine configured to predict a sequence of fuel-burn quantities over a planned flight based on at least one sequence of multivariate flight data recorded during a prior flight and on a hidden state of the trained machine,
wherein for each of a pre-selected series of prior flights, a corresponding sequence of multivariate flight data recorded during the prior flight is processed in a trainable machine to develop the hidden state, which minimizes an overall residual for replicating the fuel-burn quantities in each corresponding sequence
a summation engine configured to sum the fuel-burn quantities over the planned flight, to obtain a fueling estimate; and
an output engine configured to output the fueling estimate.

17. The machine of claim 16 wherein the output engine is further configured to output an emissions estimate based on the fueling estimate.

18. A trainable machine comprising:
an input engine configured to receive, for each of a pre-selected series of prior flights, a corresponding sequence of multivariate flight data recorded during the prior flight;
a training engine configured to process each corresponding sequence to develop a hidden state, which minimizes an overall residual for replicating the fuel-burn quantities in each corresponding sequence;
an output engine configured to expose at least a portion of the hidden state.

19. The machine of claim 18 wherein each corresponding sequence includes flight-data recorder (FDR) data selected via principle-component analysis.

20. The machine of claim 18 wherein for each of the pre-selected series of prior flights, the corresponding sequence spans a climb phase, a cruise phase, and a descent phase of the prior flight, the trainable machine further comprising:
an adjustment engine configured to adjust each corresponding sequence to provide a common climb length for the climb phase, a common cruise length for the cruise phase, and a common descent length for the descent phase.

* * * * *